March 10, 1942.   H. D. PHILIPS   2,275,807
SLIDING SHUTTER BLADE CONSTRUCTION
Filed Feb. 16, 1940   2 Sheets-Sheet 1
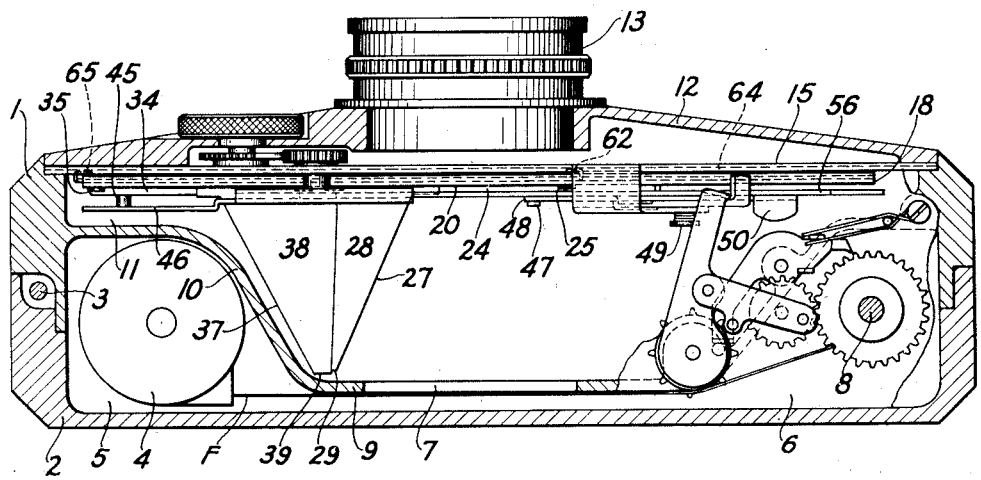
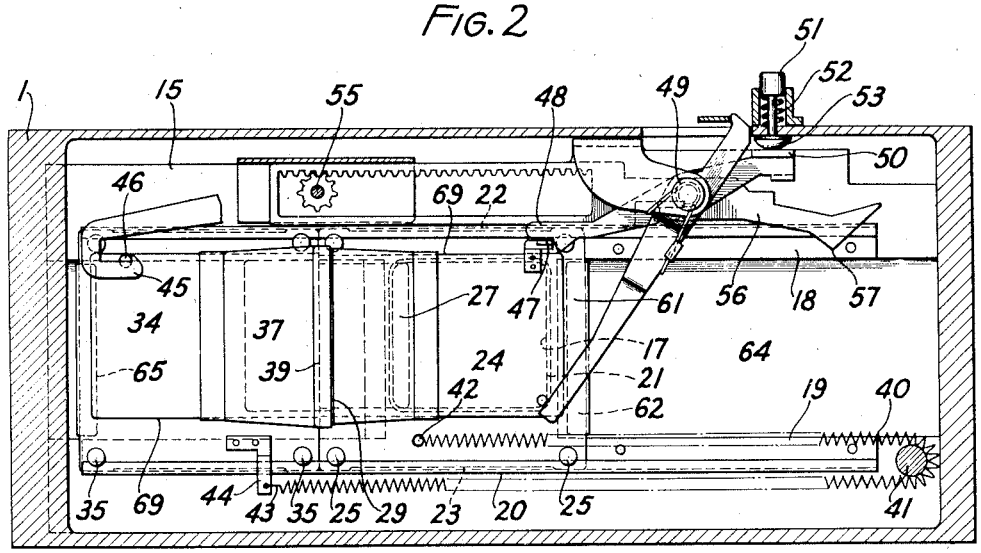
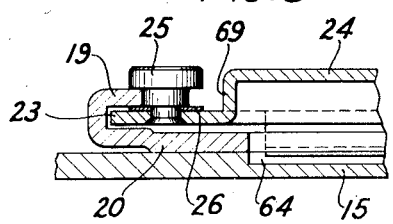
HARLOW D. PHILIPS
INVENTOR
BY
ATTORNEYS March 10, 1942. H. D. PHILIPS 2,275,807
SLIDING SHUTTER BLADE CONSTRUCTION
Filed Feb. 16, 1940 2 Sheets-Sheet 2
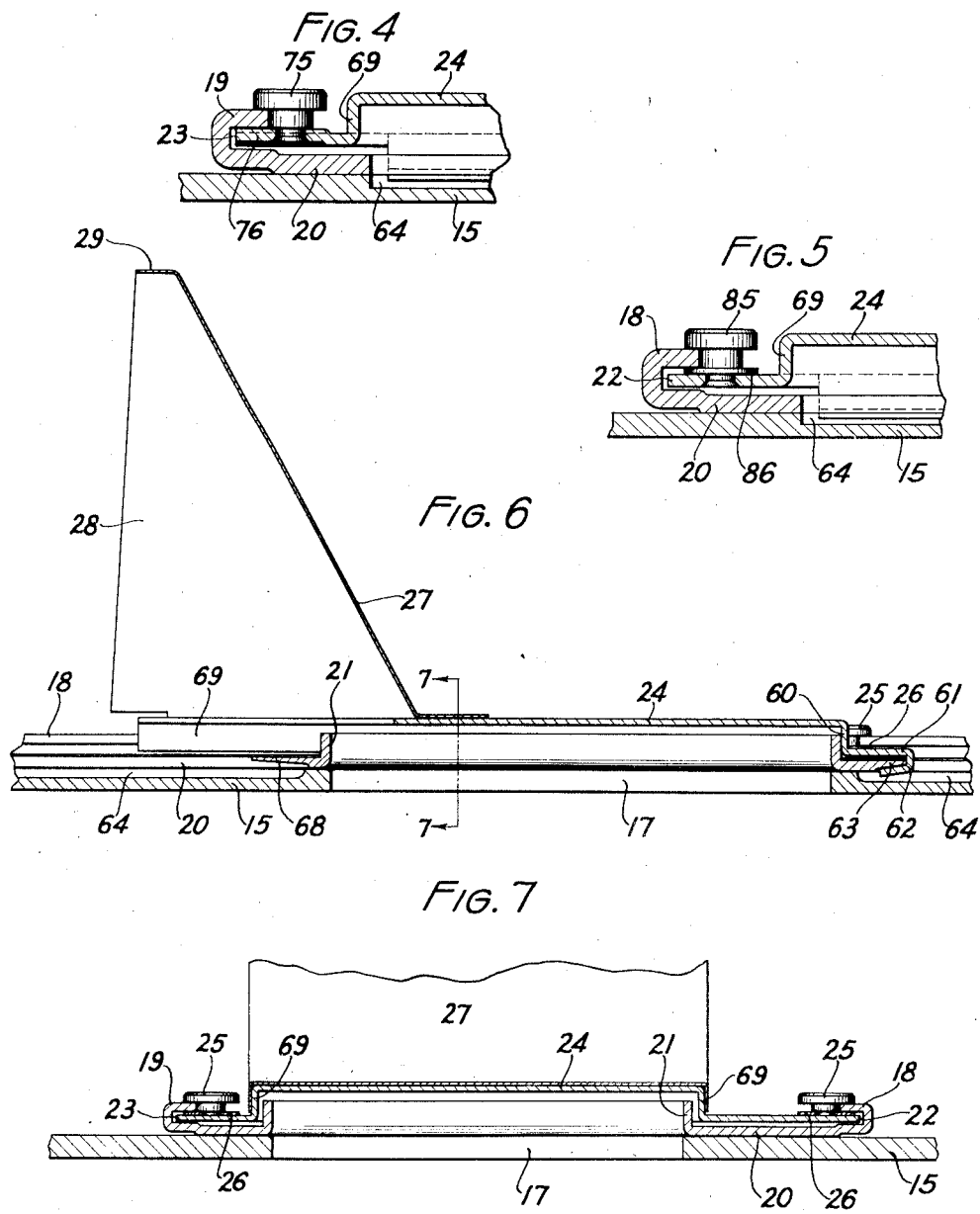

Patented Mar. 10, 1942

2,275,807

UNITED STATES PATENT OFFICE 2,275,807

SLIDING SHUTTER BLADE CONSTRUCTION

Harlow D. Philips, Rochester, N. Y., assignor to Eastman Kodak Company, Rochester, N. Y., a corporation of New Jersey Application February 16, 1940, Serial No. 319,299

9 Claims. (Cl. 95—55)

This invention relates to photography, and more particularly to photographic shutters.

One object of my invention is to provide a sliding plate type of shutter with a support which minimizes friction and which reduces the liability of trouble from particles of dirt, dust, or the like. Another object of my invention is to provide sliding shutter plates which are so positioned and supported on spaced overhanging rails that light is effectively prevented from leaking past the exposure aperture around the plates. Another object of my invention is to provide stud supports for sliding plates which have only small contact with the rails on which the shutter plates travel, and other objects will appear from the following specification, the novel features being particularly pointed out in the claims at the end thereof.

Coming now to the drawings, wherein like reference characters denote like parts throughout;

Fig. 1 is a sectional view through a camera equipped with a sliding plate shutter constructed in accordance with and embodying a preferred form of my invention.

Fig. 2 is a sectional view taken through the camera shown in Fig. 1, showing the shutter plates and their supporting rails in elevation.

Fig. 3 is an enlarged, fragmentary, sectional detail showing a stud supporting a portion of a shutter plate on a rail.

Fig. 4 is a modified form of supporting stud shown in a sectional view similar to Fig. 3.

Fig. 5 is still another modified form of stud shown in an enlarged, fragmentary section similar to Fig. 3.

Fig. 6 is an enlarged, longitudinal, sectional view showing the end light seal between one of the shutter plates in a frame surrounding the exposure aperture.

Fig. 7 is an enlarged, transverse, sectional view taken on line 7—7 of Fig. 6.

While my invention is particularly adapted to shutter plates arranged to slide on guide rails, I have shown, as a preferred embodiment of my invention, a camera shutter of the type shown in the following copending applications, Serial No. 247,423, "Camera shutter," in the name of Joseph Mihalyi, filed December 23, 1938, now Patent No. 2,206,105 of July 2, 1940, and Serial No. 312,397, "Shutter tripping device," Joseph Mihalyi, filed January 4, 1940, now Patent No. 2,238,499 of April 15, 1941. Reference may be had to these two applications for detailed construction of parts not necessarily described in detail in connection with the present application.

My shutter may be conveniently used on a camera of the type mentioned in the above applications, in which the camera may consist of a body member 1, having a back 2, hinged to the body at 3, so that it may be swung open to load a supply film 4 on a spool or in a retort in the film chamber 5. The film F may be drawn from the supply chamber to a take-up chamber 6, after passing across an exposure aperture 7. In the take-up chamber 6, there is mounted, on a shaft 8, a take-up hub on which the film may be wound, and it is customary in cameras of this type to rewind the film onto the supply spool before removing it from the camera.

The exposure frame 7 is an opening in a plate 9 which is formed forwardly and outwardly at 10, so that there will remain an elongated shutter chamber 11 between the spool chambers and the camera front wall 12, which may support an objective in a suitable mount 13.

The front wall of the camera carries a mechanism plate 15 on which the shutter is mounted and is apertured at 17, so that light may pass through this plate to make an exposure when the shutter members move across the aperture.

As best shown in Fig. 7, the plate 15 is provided with a pair of guide rails 18 and 19, carried on upper and lower edges of a plate 20, which is formed upwardly at 21 to form a frame substantially co-extensive in shape to the aperture 17. The guide rails 18 and 19 are U-shaped in cross-section and provide recesses into which the extreme edges 22 and 23 of one of the shutter plates 24 may lie, these plates being disposed symmetrically in the recesses 22 and 23 by means of studs 25 carried by the shutter plate 24, there being bronze washers 26 mounted between the studs and the shutter plate. As shown in Fig. 2, the shutter plate is provided with four supporting studs so that this plate slides on the rails 18 and 19 solely on the small portion of the studs and the bronze washers 26 beneath the studs which contact with the rails.

This construction is desirable because it reduces the contact and friction to a minimum, and because extremely accurate fitting is not required. Moreover, the U-shaped form of the rails and the edges of the sliding shutter plates fitting into the U-shaped opening forms a desirable light-tight joint between these parts. If any small particles of dirt, dust, sand, or the like should get into the camera, they would not prevent the smooth operation of these shutter members, because the edges 22 and 23 of the shutter plates do not actually contact with the rails at any point, but are supported entirely by the studs and the washers.

Shutter plate 34 is very much like shutter plate 24, in that it is entirely supported by four studs 35, two engaging the upper rail 18 and the other two engaging the lower rail 19.

Both of these shutter plates have rearwardly extending box-like housings, shutter plate 24 having a rearward extension 27 and shutter plate 34 having a rearward extension 37. These two extensions have overlapping flanges 28 and 38 along the sides and 29 and 39 on their rearward edges, so that when the plates lie in the relationship shown in Fig. 1, they form a light-tight connection between the two shutter plates. Thus, when the two shutter plates are being moved to their Fig. 2 position, they move together with their rearward extensions overlapping so that light is not permitted to pass through the objective and the registering openings 17 and 21.

As indicated in Fig. 2, each of these shutter plates is attached to a power spring 40 passing about a stud 41. One end 42 of the power spring is attached to the shutter plate 24 and the other end 43 of the spring is attached to a bracket 44, connected to the shutter plate 34.

Each plate is held in its latched position ready for an exposure—shutter plate 34 by a latch 45, engaging an upstanding pin 46 on the shutter plate, and shutter plate 24 by a latch 47 engaging the latch element 48, pivoted at 49, and having an extension 50 lying beneath a trigger member 51.

This trigger member is pressed upwardly by a spring 52, but when it is depressed, the knob 53 depresses one end of the latch member, pivoted on the stud 49, releasing the latch 47—48 and permitting the shutter member 24 to slide rapidly to the right with respect to Fig. 2.

The time of exposure depends on the release of the second shutter after that of the first shutter. This is accomplished by means of a two-part lever, the latch 46 being on one arm of the lever which is pivoted to turn on the stud 55 and which includes an adjustable arm 56 having a downward extension 57 lying in the path of the latch element 47. Thus, when the trigger 51 is depressed and the shutter element 24 moves rapidly to the right, it will strike the downward extension 57, rocking the lever 56 about its pivot 55 and releasing the latch 45—46 so that the second shutter plate may follow the first.

In the above described Mihalyi applications, means for varying the exposures quite widely are set forth at length, and since this speed control forms no part of the present application, it need not be further described herein.

In order to form a light-tight connection between the shutter plates and the frame 21, extending about the aperture 17, I prefer to form the shutter plates as follows: As indicated in Fig. 6, the shutter plate 24 may be formed downwardly at 60, outwardly at 61, and then bent inwardly in the form of a hook 62 substantially complementary in shape to the edge 63 of the plate 20 which lies on top of the plate 15. This plate is rabbeted out at 64 to provide a way for the folded-over hook-like end of the shutter plate 24 to slide in.

The shutter plate 34 has a similar forming at 65 which is arranged on the left-hand edge of the plate instead of on the right-hand edge, as for shutter plate 24 when facing the shutter as shown in Fig. 2. Thus, when the shutter is set, as in Fig. 2, the hook-like end 62 surrounds and forms a light-tight joint with the edge 63 of the plate 20. However, after the shutter has been operated and the parts have moved from the position shown in Fig. 2 across the aperture 17, the hook-like edge 65 of shutter plate 34 will engage the edge 68 on the opposite side of the frame 21 so that the shutter will form a light-tight joint with this frame member in either its set or its rest position.

From the longitudinal section in Fig. 6, the overlapping flange construction 60, 61, 62 and 63 of shutter plate 24 is clearly illustrated. From Fig. 7, it will be noticed that the shutter plate is also formed downwardly above and below the aperture 21. Thus, the bends in the plate at 69 form flanges over the top and bottom of the frame walls 21, forming an additional light guard along the upper and lower edges of each shutter plate, since a similar construction is used for the shutter plate 34.

Shutter plate 24 has, therefore, a light guard (referring to Fig. 2) along the right-hand edge of aperture 17 and along the upper and lower edges of this aperture. Shutter plate 34 has a light guard along the left-hand edge of the aperture 17 and also along the upper and lower edges of this aperture. The only part where the aperture can be exposed to light is between the rearward extensions 27 and 37 when these are opened up in making an exposure.

Obviously, a number of modifications can be made without departing from my invention. While I prefer to provide studs and bronze washers for supporting the shutter plates, as indicated in Fig. 3, because this is an inexpensive and an entirely satisfactory mounting for the shutter plates, I also find that the modifications shown in Figs. 4 and 5 are satisfactory. As indicated in Fig. 4, the stud 75 is mounted on a shutter plate 24 and the shutter plate has been formed upwardly at 76 for a small area beneath the stud of somewhat the same shape as the head of the stud except that it extends out to the edge of the shutter plate. Thus, in this form the bronze washer 26 is omitted, but there is in its place an area of the plate formed upwardly so that the shutter plate 24 may be supported solely by the raised protuberance 76 and the head of the shutter plate 75. This construction is satisfactory for most metals, but if the shutter plates are formed of extremely thin aluminum as preferred, I have found that the aluminum tends to wear when continuously operated in contact with the steel rails 18 and 19.

Fig. 5 is another embodiment in which the studs 85 are provided with shoulders 86, the studs being directly riveted to the shutter plates 24. This structure is quite satisfactory and, as in the other embodiments, it supports the extreme edge 22 of the shutter plate 24 between the U-shaped walls of the rail 18. Thus, in all of these embodiments there is a minimum of contact between the shutter plates and their supporting rails, so that with the rails 18 and 19 equally spaced throughout their length, it is a comparatively simple matter to fit the shutter plates to the rail. I have found that the stud type of support does not require extreme accuracy of the studs, as the shutter plates appear to slide equally well with quite a close or quite a loose fit.

Regardless of the type of studs which are used to support the shutter plates, the formation of these plates with their rails and with the frames extending around the apertures through which the exposure takes place is such that there is always a substantial light trapped path which would prevent light from fogging film by passing through the open objective to the exposure frame. The only time when light may pass is when one shutter is operated in advance of the other to produce a slot through which light passes to make an exposure.

What I claim is:

1. In a shutter for cameras, the combination with a support, of overturned rails mounted on and spaced from the support, shutter plates, studs carried by the shutter plates forming the sole contact between the shutter plates and the rails, the edges of the shutter plates extending beneath and lying close to the overturned rails to form a light tight connection therewith.

2. In a shutter for cameras, the combination with a support, of overturned rails mounted on and spaced from the support, shutter plates, studs carried by the shutter plates positioned to contact with the rails, means for spacing the plates from the rails and the support, whereby there is no contact between the plates and rails, the edges of the shutter plates lying under, close to and out of engagement with said rails and support to form light tight connections therewith.

3. In a shutter for cameras, the combination with an apertured support, rails of U-shape in cross section mounted on the support, a flanged frame extending from the aperture of the support, shutter plates formed to closely approach the flanged frame with angularly formed walls to make light tight partitions therewith, studs carried by the shutter plates and engaging the rails and forming the sole contact between the shutter plates and rails on which the plates may slide.

4. In a shutter for cameras, the combination with an apertured support, rails U-shaped in cross section mounted on the support, a flanged frame extending from the aperture of the support, shutter plates formed to closely approach the flanged frame with angularly formed walls to make light tight partitions therewith, studs carried by the shutter plates and engaging the rails, spacers between the plates and rails and adjacent the studs whereby the shutter plates may contact with the rails solely through the studs whereby said shutter plates may slide freely on said rails.

5. In a shutter for cameras, the combination with an apertured support, rails, U-shaped in cross section mounted on the support, a flanged frame extending from the aperture of the support, shutter plates formed to closely approach the flanged frame with angularly formed walls to make light tight partitions therewith, studs carried by the shutter plates and engaging the rails, heads on the studs, washers surrounding said studs and contacting with said plates whereby the plates may be slidably supported on said rails between the stud heads and washers.

6. In a shutter for cameras, the combination with a support, rails U-shaped in cross section mounted on the support, an aperture in the support through which an exposure may be made, a flange extending completely around the aperture, two shutter plates, studs carried by the shutter plates for slidably mounting the plates on the rails, each shutter plate having formed walls positioned to lie close to the walls of the flange on three sides thereof, all of said walls lying out of contact therewith, to form a light trap between the support and shutter plates.

7. In a shutter for cameras, the combination with a support, rails formed over substantially parallel to and spaced from the support, an aperture in the support through which an exposure may be made, a flange extending completely around the aperture, two shutter plates, studs carried by the shutter plates for slidably mounting the plates on the rails, each shutter plate having formed walls positioned to lie close to the walls of the frame on three sides thereof, all of said walls lying out of contact therewith, to form a light trap between the support and shutter plates, and overlapping flanges on the two shutter plates to form a light trap between the two shutter plates.

8. In a shutter for cameras, the combination with a support, rails mounted on the support, an aperture in the support, a flange extending around the aperture through which an exposure may be made, two ends of the flange being L-shaped in cross section and extending transversely of the rails, two shutter plates, studs carried by the shutter plates for slidably mounting the plates on the support, and U-shaped formings across the ends of the shutter plates and extending transversely of the rails for engaging and forming a light tight joint with the L-shaped portions of the frame.

9. In a shutter for cameras, the combination with a support, of an apertured plate attached to the support, folded over edge flanges on the plate forming parallel rails, a four-walled frame extending around the apertured plate, two shutter plates slidably mounted on the parallel rails, the edges of said plates extending into and lying out of contact with and forming a light trap with the folded over edge flanges forming the rails, walls formed on each shutter plate adapted to fit close to but to be spaced from three walls of the four-walled frame to form with the frame wall a light trap, and overlapping edge walls on the shutter plates constituting a light seal through which light may pass only when one shutter plate is moved relative to the other by sliding on the parallel rails to make an exposure.

HARLOW D. PHILIPS.